(No Model.)

W. D. ARNETT.
GRAIN DRILL.

No. 374,514. Patented Dec. 6, 1887.

ON LINE X—X

Attest.
Sidney P. Hollingsworth
W. R. Kennedy,

Inventor.
W. D. Arnett,
By his atty.
O. T. Dodge

UNITED STATES PATENT OFFICE.

WILLIAM D. ARNETT, OF DENVER, COLORADO.

GRAIN-DRILL.

SPECIFICATION forming part of Letters Patent No. 374,514, dated December 6, 1887.

Application filed April 19, 1887. Serial No. 235,336. (No model.)

*To all whom it may concern:*

Be it known that I, WILLIAM D. ARNETT, of Denver, in the county of Arapahoe and State of Colorado, have invented certain Improvements in Grain-Drills, of which the following is a specification.

This invention relates to an improved manner of connecting the drag bars or beams of a grain-drill or seeding-machine to the main frame, being designed more particularly for use in those machines in which the drag-bars are provided with furrow-opening disks arranged obliquely to the line of travel, and which by reason of the lateral pressure of these disks require the drag-bars to be supported more firmly than in other machines.

Figure 1:
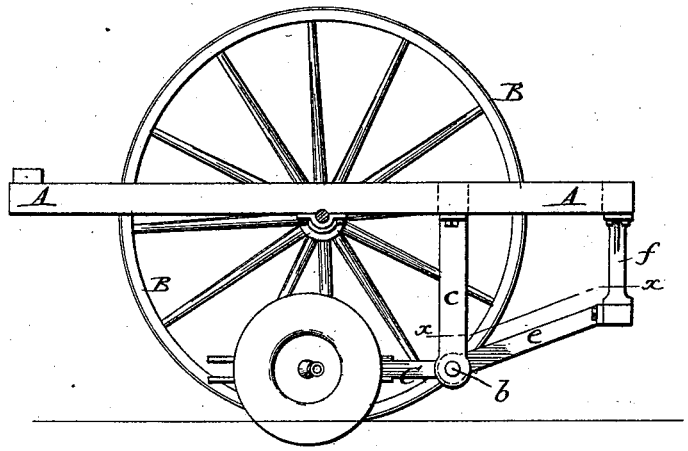
Figure 2:
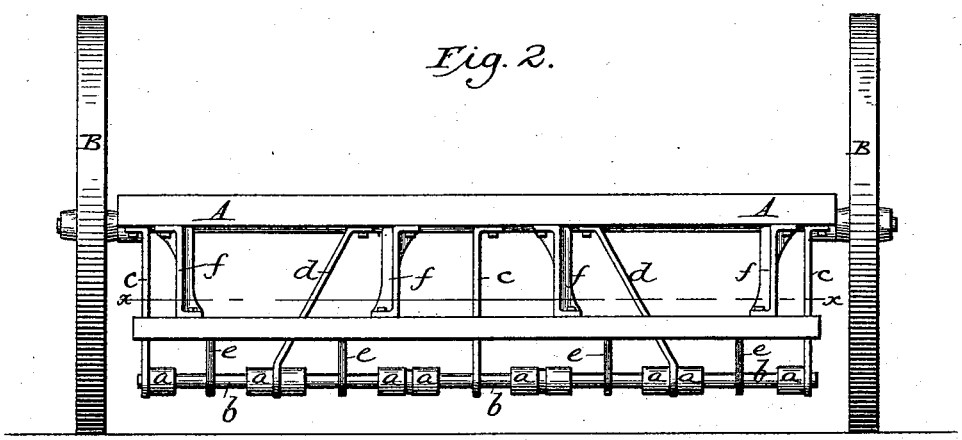
Figure 3:
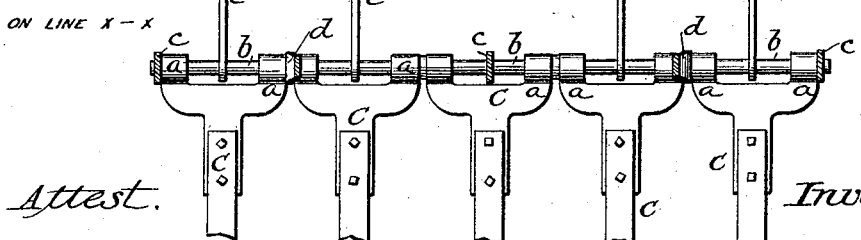

In the accompanying drawings, Figure 1 represents a side view of a portion of a grain-drill frame having my improvements applied thereto. Fig. 2 is a front elevation of the same. Fig. 3 is a horizontal section on the line $x\ x$ of Fig. 1, looking in a downward direction.

Referring to the drawings, A represents a rectangular main frame, which may be constructed and mounted on ground-wheels B in the usual manner.

C C represent the drag bars or beams, each having at the forward end a forked or bifurcated head with two arms, $a\ a$. The entire series of beams have their heads mounted on a transverse shaft, $b$, underlying the main frame and extending from side to side. This shaft is sustained at its ends and its middle by vertical arms $c$, bolted at their upper ends rigidly to the under side of the main frame, and provided at their lower ends with openings through which the shaft passes. At points between the middle and their ends the shaft is further supported by braces $d$, inclining laterally inward and bolted at their upper ends to the frame. The series of heads and braces are arranged in close order—that is to say, each in contact with the next—from one side of the machine to the other, so that the inclined braces act to prevent the parts from swaying laterally.

In order to support the standards $c$ and shaft $b$ against the rearward strain of the drag-bars, I connect to the shaft forwardly-extending drag bars or arms $e$, attached at their forward ends to arms $f$, secured rigidly to and depending from the front end of the main frame.

It is to be noted that under my construction the axis of the drag-bars is thrown far below the frame and to substantially the level of the axis of the disks, so that the draft has no tendency to lift the furrow-opening disks out of the ground. The system of supports is such that although the shaft $b$ is at a distance from the frame it is firmly braced and supported therefrom, so that it cannot bend or twist in such manner as to permit lateral play of the drag-bars at their rear ends.

Having thus described my invention, what I claim is—

1. In a seeding-machine, the combination of the wheeled main frame, the drag-bars having the forked draw-heads, the transverse shaft on which said heads are mounted, the depending arms to sustain said shaft, the draft bars or arms extending forward from said shaft, the bar to which the draft-arms are connected at the front, and means, substantially as described, for supporting said shaft from the main frame.

2. In a seeding-machine, the combination of the wheeled main frame, the drag-bars having the forked or widened draw-heads, the horizontal shaft on which said heads are mounted, and rigid depending supports, substantially as described, sustaining said shaft below the main frame.

3. In a grain-drill, the combination of the main frame, the depending arms at its front, the cross-bar sustained by said arms, the draft bars or arms extending from the front bar rearward, the shaft extended from said draft-bars, the depending arms to sustain said shaft, and the drag-bars mounted at their forward ends on the shaft, substantially as described.

4. In combination with the wheeled frame and the transverse shaft on which the drag-bars are journaled, the depending arms $c$ and the laterally-inclined arms $d$, connecting the shaft with the main frame.

WILLIAM D. ARNETT.

Witnesses:
 WILLIAM J. ACHESON,
 GEO. M. BACON.